United States Patent
Knight et al.

[11] 3,907,751
[45] Sept. 23, 1975

[54] MOULDING COMPOSITION

[75] Inventors: Michael Horace Knight; Barbara Mitchell; Maurice James Ratcliffe, all of Runcorn, England

[73] Assignee: Imperial Chemical Industries Limited, London, England

[22] Filed: Oct. 27, 1972

[21] Appl. No.: 301,331

[30] Foreign Application Priority Data
Nov. 10, 1971 United Kingdom............... 52152/71

[52] U.S. Cl....... 260/47 UA; 260/42.17; 260/42.18; 260/77.5 AM; 260/77.5 B; 260/859 R; 260/897 B

[51] Int. Cl.².. C08F 3/62; C08F 3/84; C08F 15/02; C08F 35/06

[58] Field of Search 260/47 UA, 77.5 BB, 77.5 AM, 260/80 NC

[56] References Cited
UNITED STATES PATENTS
3,598,866   8/1971   Nowak................................ 260/479

Primary Examiner—Christopher A. Henderson, Jr.
Attorney, Agent, or Firm—Cushman, Darby & Cushman

[57] ABSTRACT

Moulding composition in particulate form comprising at least one prepolymer containing urethane groups and having the structure

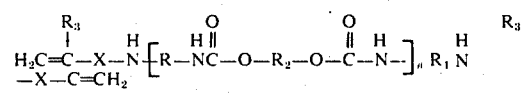

and hereinafter referred to as the vinyl-ended prepolymer, in which $R_1$ and $R_2$ are each divalent organic groups at least one of which contains at least one cyclic group in the chain and are such that in said structure there are not more than 20 atoms in the chain between each cyclic group, $n$ is a whole number of from 1 to 20, and when $n$ is one and only $R_2$ contains a cyclic group in the chain there are no more than 20 atoms in the chain between the cyclic group in $R_2$ and the nitrogen atom attached to the group X, $R_3$ is hydrogen or a hydrocarbyl group and X is a divalent group are useful in forming articles such as films.

15 Claims, No Drawings

MOULDING COMPOSITION

This invention relates to moulding compositions and to shaped articles produced from said compositions.

According to the present invention there is provided a moulding composition comprising at least one polymerisable prepolymer having the structure

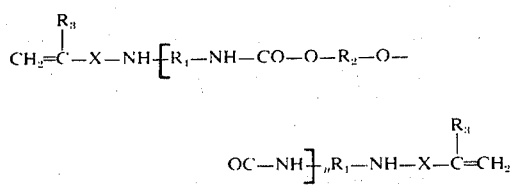

hereinafter referred to as the vinyl-ended prepolymer in which $R_1$ and $R_2$ are each divalent groups at least one of which contains at least one cyclic group in the chain of the vinyl-ended prepolymer and which are such that in said structure there are not more than 30 atoms in the chain between adjacent cyclic groups, $n$ is a whole number of from 1 to 20, and when $n$ is one and only $R_2$ contains a cyclic group in the chain there are not more than 30 atoms in the chain between the cyclic group in $R_2$ and the nitrogen atom attached to the group X, $R_2$ is a divalent group having the structure

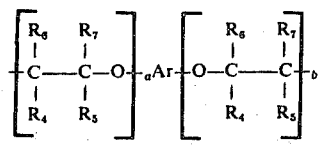

where $R_4$, $R_5$, $R_6$ and $R_7$ are hydrogen atoms or hydrocarbyl groups, a and b are integers and Ar is a divalent aromatic group in which each free valency is on an aromatic carbon atom, $R_3$ is a hydrogen atom or a hydrocarbyl group, and X is a divalent group.

Where we refer to atoms in the chain we refer to atoms forming part of the chain of the prepolymer and we exclude atoms or groups pendant from the chain.

The moulding compositions of our invention are generally storage stable, especially at or near ambient temperature, and may be polymerised and moulded to form shaped articles. By including cyclic groups in the chain of the vinyl-ended prepolymer and by placing a limit on the number of atoms in the chain of the vinyl-ended prepolymer between adjacent cyclic groups we find that the shaped articles prepared from the moulding compositions of our invention by shaping and polymerising the compositions have a good combination of properties, and in particular, a good combination of environmental properties, e.g. solvent resistance, impact strength and heat distortion temperature.

Preferably, the moulding compositions are in particulate form as in this case they are conveniently handlable. By particulate form we include, for example, a powder form, both course and fine-grained, and chip form.

The vinyl-ended prepolymer may be fused by the action of heat, moulded into any desired shape, and cured by initiating polymerisation of the vinyl end-groups on that prepolymer. Polymerisation of the vinyl end-groups, which may be catalysed by a suitable heat activatable free-radical generator or which may be effected merely by heating the composition, results in cross-linking of the prepolymer chains to produce a cured resin.

In a further embodiment of our invention we provide a moulding composition, preferably in particulate form, and comprising at least one vinyl-ended prepolymer as herein described and at least one free-radical generator capable of initiating polymerisation of the vinyl-ended prepolymer.

Suitably, the free-radical generator may be used in an amount such that the composition contains from 0.01 to 5%, preferably 0.1 to 5% by weight of free-radical generator by weight of the vinyl-ended prepolymer in the composition, although amounts outside these ranges may be used if desired.

If desired, the moulding composition may contain at least one copolymerisable vinyl monomer, other than the vinyl-ended prepolymer, in an amount less than 5% by weight of the vinyl-ended prepolymer in the composition. When a vinyl-ended prepolymer in particulate form is desired and the other vinyl monomer is a liquid then the amount of the latter vinyl monomer in the composition should be such that a composition in particulate form can still be obtained.

By vinyl monomer we mean a monomer containing at least one ethylenically unsaturated monomer in a terminal group.

The vinyl-ended prepolymer may be prepared by reacting a vinyl monomer containing an isocyanate-reactive group with an isocyanate-ended urethane prepolymer having the structure

where $R_1$, $R_2$ and $n$ have the designations as hereinbefore described. The prepolymer having the structure III will hereinafter be referred to as the isocyanate-ended prepolymer.

The isocyanate-ended prepolymer may be prepared in conventional manner by reacting a diol, or mixture of diols, having the structure $HO - R_2 - OH$, where the group $R_2$ has the structure II, with a diisocyanate, or mixture, of diisocyanates, having the structure $OCN - R_1 - NCO$. In order that the isocyanate-ended prepolymer may have isocyanate end-groups it will be appreciated that a molar excess of the diisocyanate over the diol must be used in the preparation of the prepolymer the value of n in the prepolymer depending on the molar proportion of diisocyanate to diol used, the value of n decreasing as this latter ratio increases.

The isocyanate-ended prepolymer is conveniently formed by effecting reaction of the diol and the diisocyanate in an inert organic liquid which is a solvent for the diol and the diisocyanate and for the isocyanate-ended prepolymer. The most suitable solvents are those which are low boiling and which are readily dried. Examples of suitable solvents are chlorinated hydrocarbons e.g. methylene choride, chloroform, and trichloroethylene; acetone, methyl ethyl ketone, and ethyl acetate. The reaction may be aided by addition of a catalyst for urethane formation. Such catalysts are well-known in the art; examples are teritary amines, and metal compounds e.g. stannous octoate and dibutyl tin dilaurate.

The vinyl-ended prepolymer may be prepared by reacting a vinyl monomer containing an isocyanate-reactive group, e.g. a carboxyl or hydroxyl group, with the isocyanate-ended prepolymer, the reaction conveniently being effected in an inert diluent which is a solvent for the reactants and for the vinyl-ended prepolymer product and which may be the same diluent as that in which the urethane-ended prepolymer is prepared.

When the production of the vinyl-ended prepolymer is complete the moulding composition of our invention may be isolated by removing the solvent, e.g. by vacuum distillation, to leave the prepolymer, generally in particulate, e.g. powder form. Where the composition is to contain a free-radical generator the generator may be added to the solution before removal of the solvent in which case removal of the solvent will leave a composition of vinyl-ended prepolymer and free-radical generator. Alternatively, the free-radical generator may be mechanically mixed with the vinyl-ended prepolymer, for example, when the latter is in particulate form after isolation from the solvent.

The properties of the shaped articles prepared by shaping and polymerising the moulding compositions of our invention will depend on the nature of the vinyl-ended prepolymer, and in particular on the nature of the groups $R_1$ and $R_2$ and the value of n in the prepolymer.

Thus, we have found that the heat distortion temperatures of the shaped articles produced from the compositions of our invention generally decrease with increase in the number of atoms between cyclic groups in the vinyl-ended prepolymer. On the other hand, the impact strengths of the shaped articles generally increase with increase in the number of atoms between the cyclic groups. Where it is desired to produce an article having a particularly good combination of softening point and impact strength it is preferred to choose the nature of the diol, or mixture thereof, and the nature of the diisocyanate, or mixture thereof, from which the isocyanate-ended prepolymer is produced to give in the prepolymer not more than 20, and more preferably not more than 12 or even 9 atoms between adjacent cyclic groups in the prepolymer chains. Similarly, in the case where, in the vinyl-ended prepolymer having the structure I, n is one and only $R_2$ contains a cyclic group in the chain it is preferred that there are not more than 20 atoms, and more preferably not more than 12 or even 9 atoms between the cyclic group in $R_2$ and the nitrogen atom attached to the group X.

Similar considerations apply to the selection of the value of n in the vinyl-ended prepolymer. As n increases, that is, as the molecular weight of the vinyl-ended prepolymer increases, the impact strengths of articles prepared therefrom will generally increase and the heat distortion temperatures will generally decrease. For a good combination of properties n is preferably not greater than 10. The proportion of the diol or mixture thereof to the diisocyanate or mixture thereof should be chosen to give in the isocyanate-ended prepolymer the desired value of n. Thus, as n is at least 1, the molar ratio of diol to diisocyanate used in production of the isocyanate-ended prepolymer should be not less than 1:2. Ratios less than this may be used if desired, although this will be wasteful of diisocyanate and will thus be economically undesirable and in any case may lead to the production of products having unsatisfactory properties. Where it is desired to produce an isocyanate-ended prepolymer having a value of n of 10, the molar ratio of diol to diisocyanate should be about 1:1.1.

The impact strengths and heat distortion temperatures of the articles prepared from the moulding compositions are also governed by the nature of the group $R_1$ in the vinyl ended prepolymer. In general, where the group $R_1$, in addition to the group $R_2$, has at least one cyclic group in the chain of the vinyl-ended prepolymer than the heat distortion temperature of the shaped article prepared from the moulding composition will generally be higher and the impact strength will generally be lower than when only the group $R_2$ contains such a cyclic group in the chain.

The diol from which the isocyanate-ended prepolymer is prepared has the structure

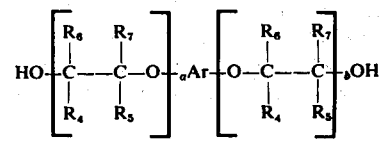

in which $R_4$, $R_5$, $R_6$ and $R_7$ are hydrogen atoms or hydrocarbyl groups, a and b are integers and Ar is a divalent aromatic group in which each free valency is on an aromatic carbon atom and in which one or more of the hydrogen atoms on the ring carbon atoms may be replaced by groups which are unreactive towards hydroxyl and isocyanate groups.

Suitably, $R_6$ and $R_7$ are hydrogen atoms and $R_4$ and $R_5$ are hydrogen atoms or alkyl groups, for example, methyl. Preferably, $R_6$ and $R_7$ are hydrogen atoms and one of $R_4$ and $R_5$ is a hydrogen atom and the other is a methyl group.

The values which may be placed on the integers a and b will depend on the nature of the group $R_1$ in the vinyl-ended prepolymer. Thus, if the group $R_1$ contains a cyclic group in the chain attached directly to the urethane linkage — NH — CO — O — then if there are to be not more than 30 atoms in the chain between adjacent cyclic groups, a and b should each be not greater than 9, and preferably, where there are to be not more than 20 atoms in the chain between adjacent cyclic groups, a and b should each be not greater than 5. The values of a and b will be correspondingly less where the group $R_1$ does not contain a cyclic group in the chain or where the group $R_1$ contains an in-chain cyclic group and also contains in-chain non-cyclic groups between the latter cyclic group and the urethane linkage — NH — CO — O —.

In the diol having the structure

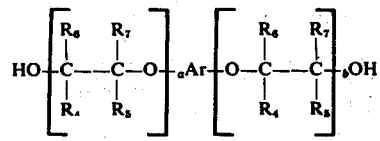

the group Ar may be mononuclear, e.g. as in phenylene, fused polynuclear, e.g. as in naphthalene or anthracene, or preferably has the structure

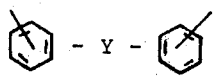

in which Y is a divalent link, e.g. —O—, —SO$_2$—, —CO—, —CH$_2$ or hydrocarbyl substituted derivative of —CH$_2$—, e.g.

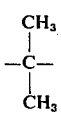

Particularly preferred diols are oxyalklated derivatives of bisphenols having the structure

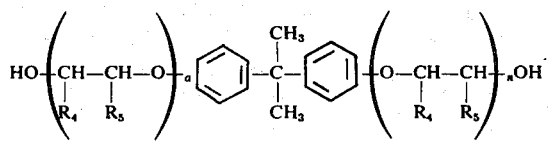

where one of R$_4$ and R$_5$ is hydrogen and the other is methyl, or both R$_4$ and R$_5$ are hydrogen.

Diisocyanates which may be used to prepare the isocyanated-ended prepolymer include, for example, diisocyanates in which the chain between the isocyanate groups is provided by an aliphatic group, a cyclic group, e.g. an aromatic group or a cycloaliphatic group, or by a group which includes in combination at least two of aliphatic, aromatic or cycloaliphatic groups.

Suitable aliphatic diisocyanates include tetramethylene diisocyanate, pentamethylene diisocyanate and hexamethylene diisocyanate.

Cycloaliphatic diisocyanates include, for example, diisocyanates of the structure:

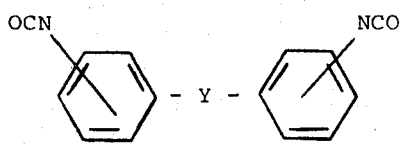

where — Y — is a divalent link which may be, for example —CH$_2$— or hydrocarbyl substituted derivative thereof, —O—, —SO$_2$— or —CO—, and the isocyanate groups are linked meta or para to the group Y. A particular example is 4:4'-dicyclohexylmethane diisocyanate.

Aromatic diisocyanates are preferred, for example 2:4 and 2:6 toluene diisocyanates, or mixtures thereof, and diisocyanates having the structure

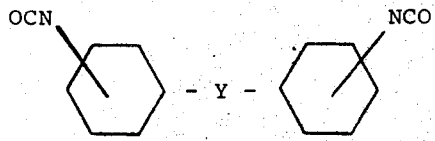

where Y is a divalent link which may have the designation described above, and in which the isocyanate groups are linked meta or para to the group Y. A preferred example is 4:4'-diphenylmethane diisocyanate where resins having a good combination of high softening point and high impact strength are desired.

A polyisocyanate having a functionality greater than two may be used, e.g. a triisocyanate. In this case the polyisocyanate may, preferably before reaction with the diol to form the isocyanate-ended prepolymer, be reacted with a suitable amount of a monofunctional isocyanate-reactive compound, e.g. an alcohol, an amine, or a carboxylic acid, so as to make the average functionality of the polyisocyanate approximately two. The polyisocyanate may even be reacted with a vinyl monomer containing an isocyanate-reactive group in which case the group R$_1$ in the vinyl-ended prepolymer will carry a vinyl group.

A particularly suitable polyisocyanate having a functionality of greater than two is that sold as Suprasec DN by Imperial Chemical Industries Limited and containing 4:4'-diphenylmethane diisocyanate and other polyisocyanates and having an average isocyanate functionality of 2.8.

The vinyl monomer containing an isocyanate-reactive group which is reacted with the isocyanate-ended prepolymer to prepare the vinyl-ended prepolymer may possess any suitable group which is reactive with an isocyanate group, e.g. —OH, —COOH, —NH$_2$, —CONH$_2$. In the vinyl monomer the group R$_3$ may suitably be methyl.

The vinyl monomer may be, for example, acrylic acid or a derivative thereof having the structure

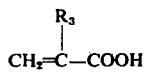

where R$_3$ is hydrogen or a hydrocarbyl group, for example, alkyl, e.g. methyl. In this case the group —X— in the prepolymer of Structure I has the structure

after elimination of carbon dioxide from the initially formed product of reaction.

Other suitable vinyl monomers include, for example, hydroxyl containing monomers having the structure

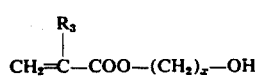

where R$_3$ is hydrogen or a hydrocarbyl group and $x$ is a whole number of at least 2, and is preferably 2, or derivatives of said monomer in which one or more of the hydrogen atoms in the group —(CH$_2$)$_x$— are substituted by a hydrocarbyl group, e.g. alkyl. In this case the group —X— in the vinyl-ended urethane prepolymer of Structure I has the structure $$- COO - (CH_2)_x - O - CO -$$

Suitable examples include hydroxy ethyl or hydroxy propyl acrylate or methacrylate made by reaction of acrylic acid or methacrylic acid with ethylene oxide or propylene oxide.

Other suitable vinyl monomers include allyl alcohol and acrylamide and derivatives thereof, e.g. methacrylamide.

As hereinbefore described, the vinyl-ended prepolymer may be cured by copolymerisation with a small amount of another vinyl monomer. Suitable vinyl monomers include vinyl esters, aromatic vinyl compounds and vinyl nitriles.

Suitable vinyl esters include, for example, vinyl acetate and esters of acrylic acid having the formula $CH_2 = CH - COOR_8$, where $R_8$ is an alkyl, aryl, alkaryl, aralkyl or cycloalkyl group. For example, $R_8$ may be an alkyl group having from 1 to 20, and preferably 1 to 10 carbon atoms. Particular vinyl esters which may be mentioned include, for example, methyl acrylate, ethyl acrylate, n- and iso-propyl acrylates, and n- iso- and tertiary-butyl acrylates.

Other suitable vinyl esters include, for example, esters of formula $CH_2 = C (R_9) - COOR_8$ where $R_9$ may be, for example, alkyl, e.g. methyl. In the ester of formula $CH_2 = C (R_9) COOR_8$, $R_8$ and $R_9$ may be the same or different. Particular vinyl esters which may be mentioned include, for example, methyl methacrylate, ethyl methacrylate, n- and iso-propyl methacrylate, and n-, iso- and tertiarybutyl methacrylate.

Aromatic vinyl compounds which may be mentioned include, for example, styrene and derivatives thereof, e.g. $\alpha$-alkyl derivatives of styrene, e.g. $\alpha$-methyl styrene and vinyl toluene.

Suitable vinyl nitriles include, for example, acrylonitrile and derivatives thereof, e.g. methacrylonitrile.

Polyfunctional vinyl monomers, that is, monomers containing two or more vinyl groups are also suitable. Suitable monomers include, for example, glycol dimethacrylate, divinyl benzene, diallyl phthalate, and triallyl cyanurate.

Another suitable vinyl monomer is vinyl pyrollidone.

The moulding composition may be moulded without difficulty by heating the composition until it will flow, causing it to confine to the walls of a mould while maintaining it in the fluid state, and exposing it to heat for a sufficient time for the polymerisation to proceed to the extent that an infusible article is produced. For example, the composition may be charged to a mould, heated while in the mould to a temperature above the softening point of the vinyl-ended prepolymer to cause the composition to fuse and adapt to the contours of the mould, and then be maintained at that temperature, or at a higher or lower temperature until polymerisation is complete. The moulding should, of course be completed before the composition becomes so intractable that it can no longer be shaped.

If desired, the moulding composition may be cured in the presence of a free-radical generator which decomposes and initiates polymerisation of the vinyl-ended urethane.

The free-radical generator may, for example, be a peroxide. Suitable peroxides include those normally used for curing unsaturated polyester resins, dicumyl peroxide, di-tertiary butyl peroxide, lauryl peroxide, benzoyl peroxide and tertiary-butyl peroctoate.

The compositions of our invention may be stored for a period of weeks or even months without undergoing a sufficient amount of polymerisation to result in the production of an intractable composition provided care is exercised in the choice of the free-radical generator. For example, a free-radical generator may be chosen which does not decompose at the temperature at which the composition is to be stored but which decomposes at a significant rate at the temperature at which moulding is to be effected. A suitable free-radical generator may readily be chosen bearing in mind the temperature at which it is desired to effect moulding.

The storage stability of the composition may be aided by including in the composition an inhibitor of free-radical polymerisation, e.g. a phenol, a quinone, or a quaternary ammonium compound. In this case it may be possible to use a free-radical generator, which decomposes to some extent at the storage temperature, polymerisation of the vinyl-ended prepolymer being supressed by the inhibitor.

The composition of our invention may also contain other ingredients, if desired, e.g. pigments, dyes, heat and light stabilisers, and fillers, e.g. finely divided solids, which may decrease shrinkage on moulding of the composition, or fibrous material, e.g. glass, asbestos or high modulus fibres or whiskers, e.g. of carbon, graphite, or boron nitride. Reinforced composites may be obtained by distributing the composition over a fibrous reinforcement, e.g. fibre rovings, fibre mat or woven fibrous materials, in a suitable mould, and then heating to soften, fuse and ultimately set the composition.

The filler may be a thermoplastic polymeric material which may be used, for example, in a proportion of up to 50% by weight of the prepolymer. We find that where the moulding composition contains a thermoplastic polymer, for example, a polyolefin, e.g. polyethylene or polypropylene, a smoother surface may be provided on articles fabricated from the moulding composition.

The invention is now illustrated by the following Examples in which all parts are expressed as parts by weight.

Tensile strengths were measured on an E-type tensometer at a strain rate of 10% per minute employing curved samples 7.62 cm long with a radius of curvature of 3.165 cm and thickness of the narrow section of 0.3165 cm, as described in Enclyclopedia of Polymer Science and Technology 1967, Vol. 7, pp 261–361. Tensile moduli were measured using prallel-sided specimens 4 in. × ¼ in. × ¼ in.

Flexural strengths and flexural moduli were measured using the procedure outlined in ASTM D790 (B) employing a strain rate of 10% minute and a span depth of 16:1 on samples of dimensions 3 in. × 1 in. × ⅛ in.

Heat distortion temperatures were measured on rectangular specimens 1 in × ¼ in. × 1/16 in. according to the British Standard 102C but with the sample in a fanned air oven and using a heating rate of 2°C per minute.

Impact strengths were measured on rectangular specimens of dimensions 2 in. × ¼ in. × ⅛ in. using a Charpy type impact tester.

EXAMPLE 1

275.2 parts of a condensate obtained by reacting 2:2'-bis(p-hydroxyphenyl)propane and propylene oxide in a molar ratio of 1:2 were heated and stirred at 70°C under an absolute pressure of 1 mm Hg for 30 minutes.

266.4 parts of 4:4'-diphenylmethane diisocyanate were similarly heated and stirred separately. The condensate and the diisocyanate were then mixed together and stirred under a vacuum of 1 mm Hg for 4–5 minutes while cooling the mixture with an ice bath. The vacuum was then released and 800 parts of methylene chloride, which had previously been placed under a vacuum of 1 mm Hg at 25°C for 30 minutes, and 0.2 part of stannous octoate were added. The mixture was initially cooled by means of an ice bath to control the exotherm produced by the formation of the isocyanate-ended prepolymer and in the later stages of the reaction the mixture was warmed in order to complete the isocyanate-ended prepolymer formation. Reaction was allowed to proceed to completion until no further heat was evolved.

69.6 parts of 2-hydroxyethyl methacrylate, which had previously been placed under a vacuum of 1 mm Hg at 25°C for 30 minutes, were then added and the resultant mixture was stirred at room temperature for 5 minutes. 2.0 parts of di-tertiary-butyl peroxide were then added and the mixture was stirred. Methylene chloride was removed on a rotary evaporator and thereafter traces of methylene chloride were removed by placing the mixture in a vacuum oven at room temperature for 48 hours. The product removed from the vacuum oven was ground into a fine powder and a portion charged to a mould formed of a pair of 4½ in. × 8 in. plates separated by a one-eighth in. deep one-half in. wide gasket. The mould was heated at 100°C for 15 minutes and then at 140°C for 2 hours under an applied pressure of 3000 lb.sq.in.$^{-1}$. Thereafter the pressure was released and the mould was heated on an oven at 140°C for 16 hours.

The sheet removed from the mould had the following properties:

| | |
|---|---|
| Tensile Strength | 11,870 lb.sq.in$^{-1}$ |
| Tensile Modulus | 3.5 × 10$^5$ lb.sq.in$^{-1}$ |
| Flexural Strength | 19610 lb.sq.in$^{-1}$ |
| Heat Distortion Temperature | 119°C. |

EXAMPLE 2

The procedure of Example 1 was followed except that 172 parts of the condensate obtained by reacting 2,2'-bis(p-hydroxyphenyl)propane with propylene oxide in a molar ratio of 1:2, 250 parts of 4,4'-diphenylmethane diisocyanate and 150 parts of 2-hydroxyethyl methacrylate were used. The product was ground into a fine powder, charged to a mould and heated following the procedure of Example 1.

The sheet removed from the mould had the following properties.

| | |
|---|---|
| Tensile Strength | 14,470 lb.sq.in$^{-1}$ |
| Tensile Modulus | 3.94 × 10$^5$ lb.sq.in$^{-1}$ |
| Flexural Strength | 20,610 lb.sq.in$^{-1}$ |
| Flexural Modulus | 4.81 × 10$^5$ lb.sq.in$^{-1}$ |
| Heat Distortion Temperature | 148°C. |

EXAMPLE 3

The procedure of Example 1 was followed except that 267.7 parts of a condensate obtained by reacting 2:2'-bis(p-hydroxyphenyl) propane and propylene oxide in a molar ratio of 1:2 and 208 parts of 4:4'-diphenylmethane diisocyanate were used. The heated 4:4'-diphenylmethane diisocyanate was dissolved in 498 parts of methylene chloride containing 0.03 part of dibutyl tin dilaurate (in place of the stannous octoate of Example 1) and the resulting solution was mixed with the heated condensate.

The resulting exotherm caused the methylene chloride to reflux for 15 minutes. Thereafter the mixture was heated to reflux the methylene chloride for a further 1½ hours.

2.2 parts of 2-hydroxyethyl methacrylate were added to the mixture and refluxing was continued for 1½ hours. The mixture was allowed to cool and 4.6 parts of tertiarybutyl peroctoate were added (in place of the di-tertiarybutyl peroxide of Example 1).

Thereafter, the procedure of Example 1 was followed to produce a powdered product which was then charged to a mould as used in Example 1 and heated at 200°C for 25 minutes under an applied pressure of 3000 lb.sq.in.$^{-1}$. The pressure was then released and the mould was heated at 140°C for a further 2 hours.

The sheet removed from the mould had the following properties

| | |
|---|---|
| Flexural Strength | 16,000 lb.sq.in$^{-1}$ |
| Flexural Modulus | 3.79 × 10$^5$ lb.sq.in$^{-1}$ |
| Unnotched Impact Strength | 9.9 ft.lb.sq.in$^{-1}$ |
| Heat Distortion Temperature | 92°C. |

EXAMPLE 4

The procedure of Example 3 was followed except that the condensate obtained by reacting 2:2'-bis(p-hydroxyphenyl)propane and propylene oxide in a molar ratio of 1:2 was replaced by 219 parts of a condensate obtained by reacting 2:2'-bis(p-hydroxyphenyl)propane and propylene oxide in a molar ratio of 1:6 and 166.7 parts of 4:4'-diphenylmethane diisocyanate and 86.7 parts of 2-hydroxyethyl methacrylate were used.

The powdered product was charged to a mould as used in Example 1 and heated for 20 minutes at a temperature of 110°C under an applied pressure of 3000 lb.sq.in$^{-1}$.

The sheet removed from the mould had the following properties.

| | |
|---|---|
| Flexural Strength | 15,700 lb.sq.in$^{-1}$ |
| Flexural Modulus | 4.21 × 10$^5$ lb.sq.in$^{-1}$ |
| Unnotched Impact Strength | 3.61 ft.lb.sq.in$^{-1}$ |
| Heat Distortion Temperature | 74°C |

EXAMPLE 5

95 parts of a powder prepared following the procedure described in Example 2 were mixed with 4.9 parts of styrene and the mixture was charged to a mould as described in Example 1. The mould was heated at 110°C for 30 minutes under an applied pressure of 3000 lb.sq.in.$^{-1}$.

The sheet removed from the mould had the following properties.

| | |
|---|---|
| Flexural Strength | 7120 lb.sq.in.$^{-1}$ |
| Flexural Modulus | 4.95 × 10$^5$ lb.sq.in$^{-1}$ |
| Unnotched Impact Strength | 5.86 ft.lb.sq.in$^{-1}$ |
| Heat Distortion Temperature | 130°C. |

EXAMPLE 6

95 parts of a powder prepared following the procedure of Example 2 were mixed with 5 parts of powdered polyethylene and the mixture was charged to a mould as described in Example 1. The mould was heated at 120°C for 60 minutes under an applied pressure of 3000 lb.sq.in$^{-1}$.

The sheet removed from the mould had the following properties.

| | |
|---|---|
| Flexural Strength | 11.400 lb.sq.in$^{-1}$ |
| Flexural Modulus | 3.93 × 10$^5$ lb.sq.in$^{-1}$ |
| Unnotched Impact Strength | 5.81 ft.lb.sq.in$^{-1}$ |
| Heat Distortion Temperature | 147°C. |

EXAMPLE 7

The procedure of Example 1 was followed except that 250 parts of 4:4'-diphenylmethane diisocyanate, 400 parts of ethylene chloride, 0.2 part of dibutyl tin dilaurate (in place of the stannous octoate), 129 parts of 2-hydroxyethyl methacrylate, and 2 parts of ditertiary-butyl peroctoate (in place of the di-tertiary-butyl peroxide) were used and, in place of the condensate as used in Example 1 there was used a mixture of 36 parts of a condensate obtained by reacting 2:2'-bis(p-hydroxyphenyl) sulphone and propylene oxide in a molar ratio of 1:2 and 133.5 parts of a condensate obtained by reacting 2:2-bis(p-hydroxyphenyl)propane and propylene oxide in a molar ratio of 1:2.

The product was ground into a fine powder and moulded following the procedure of Example 1.

The sheet removed from the mould had the following properties.

| | |
|---|---|
| Tensile Strength | 14,100 lb.sq.in$^{-1}$ |
| Tensile Modulus | 3.96 × 10$^5$ lb.sq.in$^{-1}$ |
| Flexural Strength | 21,100 lb.sq.in$^{-1}$ |
| Flexural Modulus | 4.79 × 10$^5$ lb.sq.in$^{-1}$ |
| Unnotched Impact Strength | 4.79 ft.lb.sq.in$^{-1}$ |
| Heat Distortion Temperature | 155°C |

What we claim is:

1. A moulding composition comprising a polymerisable vinyl-ended compound having the structure:

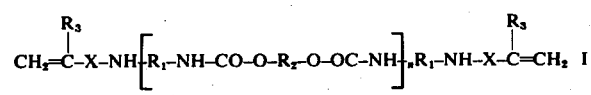

wherein:

$R_1$ is an aliphatic group, a cyclic aromatic or cycloaliphatic group or a group which includes in combination at least two of aliphatic, aromatic or cycloaliphatic groups;

$R_2$ is a divalent group having the structure:

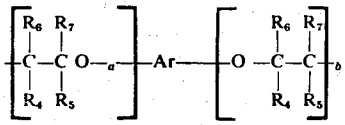

where $R_4$, $R_5$, $R_6$ and $R_7$ are each hydrogen atoms or alkyl groups, $a$ and $b$ are integers such that each is not greater than 9 and Ar is a divalent aromatic group in which each free valency is in an aromatic carbon atom;

$R_3$ is a hydrogen atom or an alkyl group;

X has the structure $-CO-O-(CR_2)_x-O-CO-$ where R is hydrogen or alkyl and where x is an integer and n is a whole number of from 1 to 20; provided that least one of $R_1$ and $R_2$ contains at least one cyclic group in the chain of the vinyl-ended compound and which are such that in said structure there are not more than 30 atoms in the chain between cyclic groups, and when $n$ is one and only $R_2$ contains a cyclic group in the chain there are not more than 30 atoms in the chain between the cyclic group in $R_2$ and the nitrogen atom attached to the group X.

2. A moulding composition as claimed in calim 1 which is in particulate form.

3. A moulding composition as claimed in claim 1 in which, in the divalent group having the structure II in the vinyl-ended compound $R_6$ and $R_7$, are hydrogen atoms and $R_4$ and $R_5$ are hydrogen atoms or alkyl groups.

4. A moulding composition as claimed in claim 3 in which one of $R_4$ and $R_5$ is a hydrogen atom and the other is a methyl group.

5. A moulding composition as claimed in claim 1 in which the composition includes at least one free-radical generator capable of initiating polymerisation of the vinyl-ended compound.

6. A moulding composition as claimed in claim 5 which contains from 0.01 to 5% of free-radical generator by weight of the vinyl-ended compound in the composition.

7. A moulding composition as claimed in claim 1 in which in the vinyl-ended compound there are not more than 20 atoms in the chain between adjacent cyclic groups and when n is one and only $R_2$ contains a cyclic group in the chain there are not more than 20 atoms in the chain between the cyclic group in $R_2$ and the nitrogen atom attached to the group X.

8. A moulding composition as claimed in claim 7 in which in the vinyl-ended compound there are not more than 9 atoms in the chain between adjacent cyclic groups and when n is one and only $R_2$ contains a cyclic group in the chain there are not more than 9 atoms in the chain between the cyclic group in $R_2$ and the nitrogen atom attached to the group X.

9. A moulding composition as claimed in claim 1 in which in the vinyl-ended compound n is not greater than 10.

10. A moulding composition as claimed in claim 1 in which in the vinyl-ended compound the group $R_1$ contains at least one cyclic group in the chain of the compound.

11. A moulding composition as claimed in claim 1 in which in the vinyl-ended compound the group $R_1$ has the structure

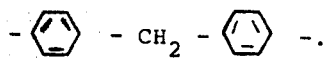

12. A moulding composition as claimed in claim 1 in which the composition contains at least one copolymerisable vinyl monomer, other than the vinyl-ended compound, in an amount of less than 5% by weight of the vinyl-ended compound in the composition.

13. A moulding composition as claimed in claim 12 in which in the group,

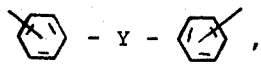

Y has the structure

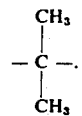

14. A moulding composition as claimed in claim 1 in which in the vinyl-ended compound the group $R_3$ is methyl.

15. A shaped polymeric article produced by shaping and polymerising a moulding composition as claimed in claim 1.

* * * * *